United States Patent [19]

Sato

[11] Patent Number: 5,068,520
[45] Date of Patent: Nov. 26, 1991

[54] SIGNAL PROCESSING CIRCUIT OF A BAR CODE READER

[75] Inventor: Shinichi Sato, Kawasaki, Japan
[73] Assignee: Fujitsu Limited, Kawasaki, Japan
[21] Appl. No.: 585,624
[22] Filed: Sep. 20, 1990
[30] Foreign Application Priority Data Sep. 22, 1989 [JP] Japan .................................. 1-247784

[51] Int. Cl.$^5$ .............................................. G06K 7/10
[52] U.S. Cl. .................................. 235/462; 235/463; 235/472
[58] Field of Search ............... 235/436, 462, 463, 472; 307/358, 359

[56] References Cited

U.S. PATENT DOCUMENTS

| | | | |
|---|---|---|---|
| 3,909,787 | 9/1975 | Laurer | 235/462 |
| 4,000,397 | 12/1976 | Hebert et al. | |
| 4,125,765 | 11/1978 | Cowardin et al. | 235/463 |
| 4,870,262 | 9/1989 | Hasegawa | 235/472 |

*Primary Examiner*—Harold Pitts
*Attorney, Agent, or Firm*—Staas & Halsey

[57] ABSTRACT

A signal processing circuit of a bar code reader, includes a signal input unit for optically detecting a bar code provided on a surface of goods and outputting a first signal after optical-to-electrical conversion, a differential unit connected to the signal input unit, for amplifying and differentiating the first signal, and filtering the differentiated first signal to eliminate high frequency noise, and outputting a second signal after filtering. A comparison unit is connected to the differential unit, for integrating the second signal and outputting a third signal after integration, and comparing the second signal with the third signal and outputting a fourth signal when the third signal is larger than the second signal. A slice level generation unit is connected to the differential unit, for holding a peak voltage of the second signal, suppressing the peak voltage to a predetermined upper limitation voltage, discharging the suppressed peak voltage in accordance with a predetermined time constant, and dividing the suppressed peak voltage into a predetermined voltage rate to obtain positive and negative slice voltages. A gate signal output unit is connected to the differential unit and the slice level generation unit, for comparing the second signal with the positive and negative slice voltages. A signal output unit is connected to the comparison unit and the gate signal output unit, for inputting the fourth signal and the positive slice voltage, the inverted fourth signal and the negative slice voltage, and outputting a gate signal to obtain a binary-coded signal.

5 Claims, 10 Drawing Sheets

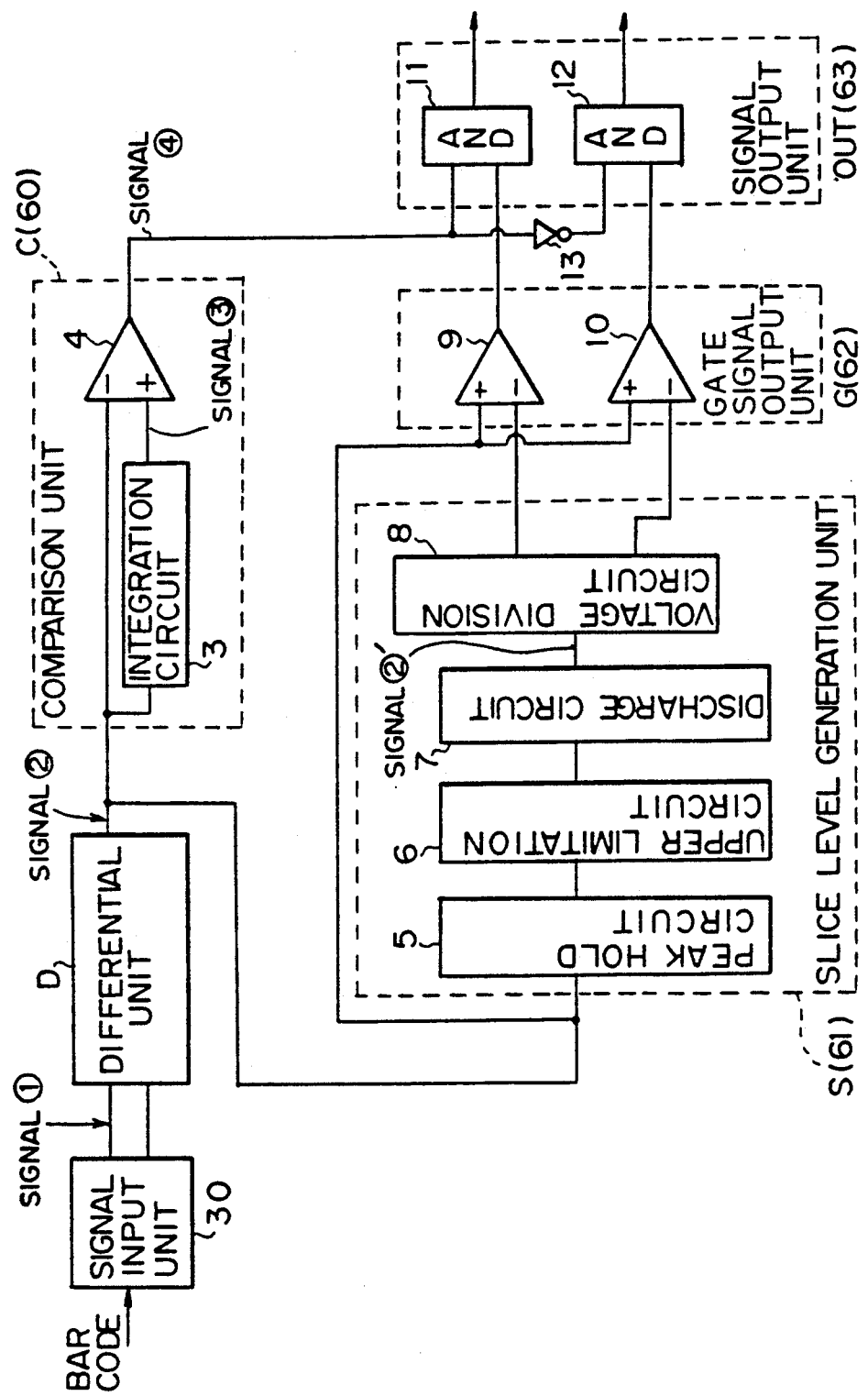

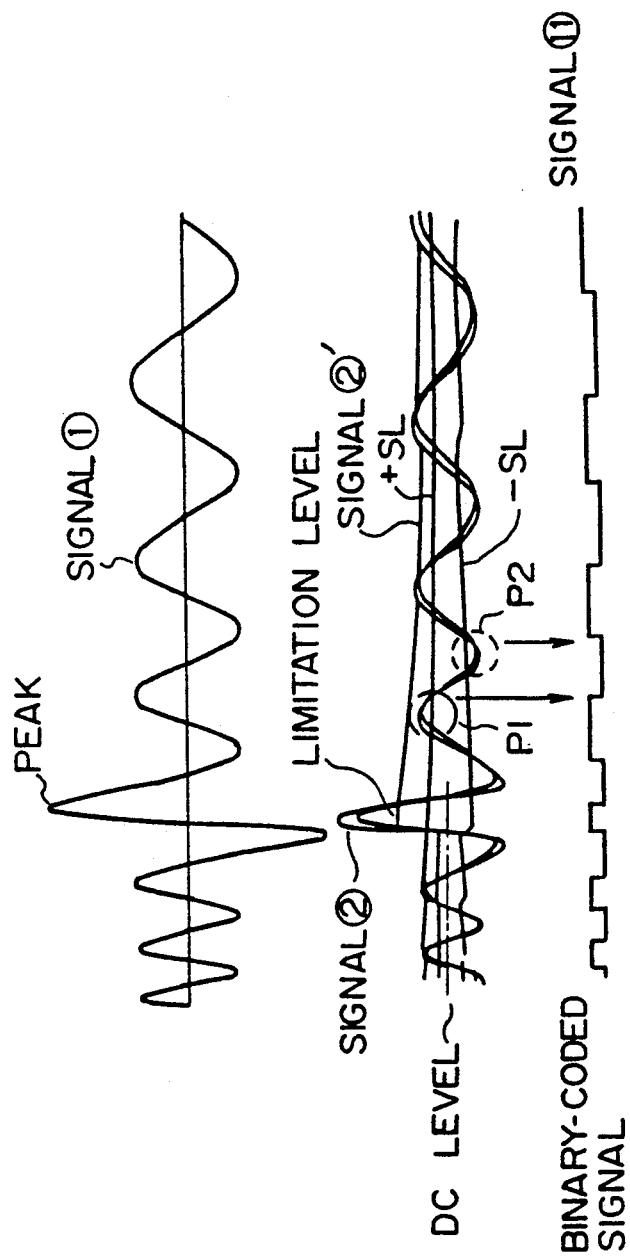

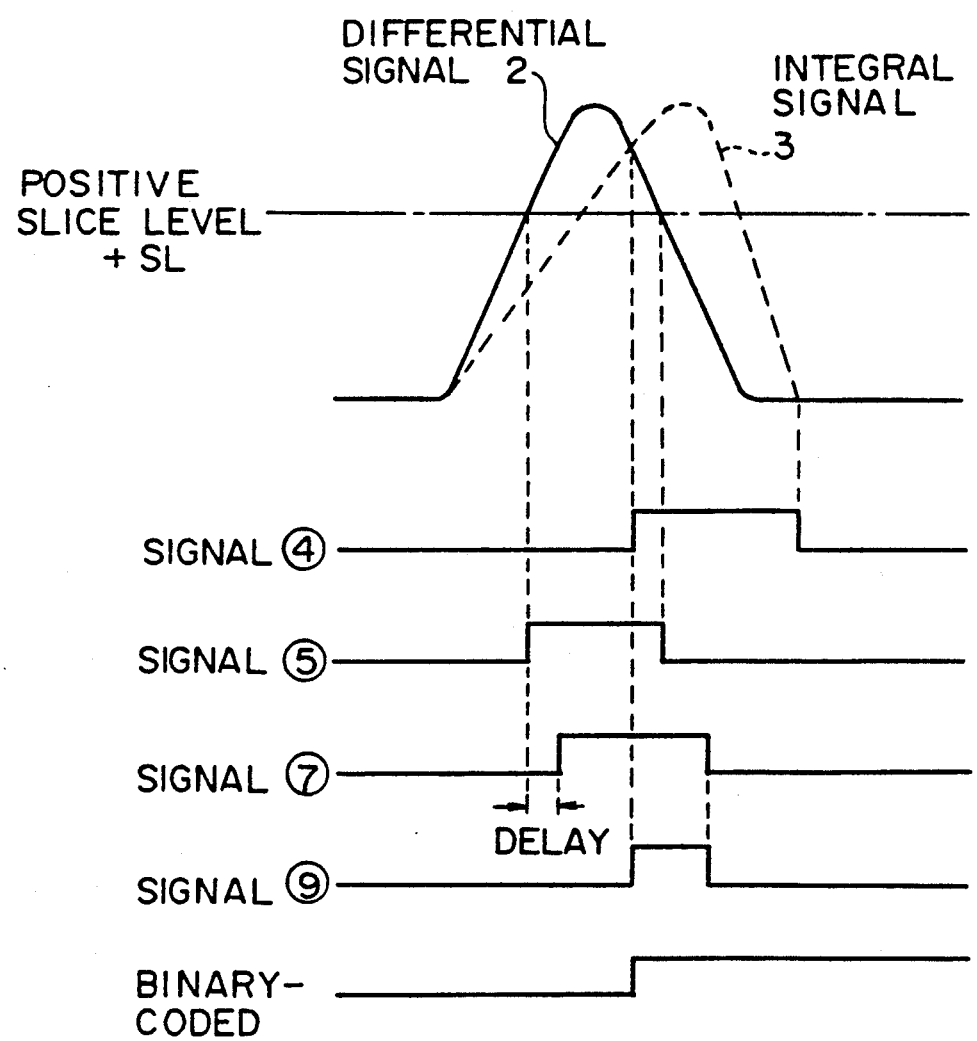

5,068,520

SIGNAL PROCESSING CIRCUIT OF A BAR CODE READER

BACKGROUND OF THE INVENTION

1. Field of the Invention

The present invention relates to a bar code reader, particularly, it relates to a signal processing circuit of the bar code reader.

2. Description of the Related Art

Recently, bar code readers are widely utilized for management of goods in a POS (point of sales) system. In general, there are mainly two types of bar codes, i.e., label type and print type. The former is labeled on the goods, and the latter is printed on the goods. The bar code is detected and binary-coded by the bar-code reader, and a binary-coded signal is output to a host computer.

In this case, it is necessary to precisely detect the bar code regardless of the kind of goods and in both cases of label type and print type to avoid a miscount. However, there are some problems in the print type when detecting the bar code printed on metal-packed goods, such as a canned juice, as explained hereinafter.

SUMMMARY OF THE INVENTION

The object of the present invention is to provide a signal processing circuit of a bar code reader enabling precise detection of the bar code, particularly, one printed on the surface of a metal can.

In accordance with the present invention, there is provided a signal processing circuit of a bar code reader including: a signal input unit for optically detecting a bar code provided on a surface of goods and outputting a first signal after optical-to-electrical conversion; a differential unit connected to the signal input unit, for amplifying the first signal, differentiating the first signal, filtering the first signal after differentiation to eliminate a high frequency noise, and outputting a second signal after filtering; a comparison unit connected to the differential unit, for integrating the second signal and outputting a third signal after integration, and comparing the second signal with the third signal and outputting a fourth signal when the third signal is larger than the second signal; a slice level generation unit connected to the differential unit, for holding a peak voltage of the second signal, suppressing the peak voltage to a predetermined upper limitation voltage, discharging the suppressed peak voltage in accordance with a predetermined time constant, and dividing the suppressed peak voltage into a predetermined voltage rate to obtain a positive slice voltage and a negative slice voltage; a gate signal output unit connected to the differential unit and the slice level generation unit, for comparing the second signal with the positive slice voltage and the negative slice voltage; and a signal output unit connected to the comparison unit and the gate signal output unit, for inputting the fourth signal and the positive slice voltage, inputting the inverted fourth signal and the negative slice voltage, and outputting a gate signal to obtain a binary-coded signal.

In one embodiment, the slice level generation unit comprises a peak hold circuit for receiving the second signal and holding the peak voltage of the second signal, an upper limitation circuit connected to the peak hold circuit for receiving an output of the peak hold circuit and suppressing the peak voltage to a predetermined upper limitation voltage, and a discharge circuit connected to the upper limitation circuit for discharging the peak voltage suppressed by the upper limitation circuit in accordance with a predetermined time constant.

In another embodiment, the predetermined voltage rate is determined to be one half of the upper limitation voltage.

In still another embodiment, the upper limitation circuit comprises an operational amplifier to reduce the peak voltage when the peak voltage exceeds the predetermined upper limitation voltage, and a variable resistor to determine the upper limitation voltage.

BRIEF DESCRIPTION OF THE DRAWINGS

In the drawings:

FIG. 4 is a block diagram of a signal processing circuit of a bar code reader according to the present invention;

FIG. 5 is a waveform diagram of waveforms at various points of a signal processing circuit shown in FIG. 4;

FIG. 10 is a detailed waveform diagram of the waveforms shown in FIG. 9.

DESCRIPTION OF THE PREFERRED EMBODIMENTS

Figure 1:
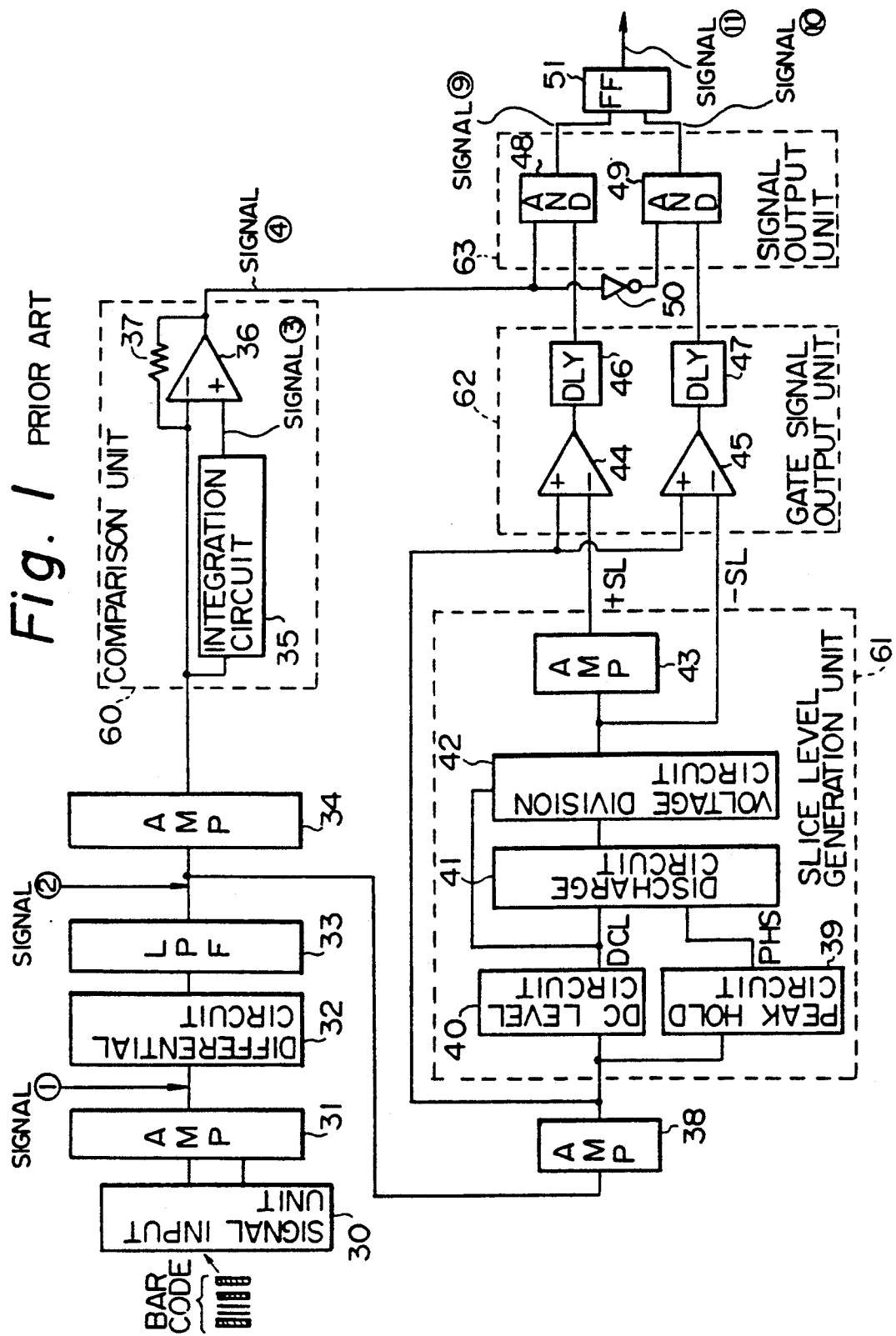
FIG. 1 is a circuit diagram of a conventional signal processing circuit of a bar code reader.

Before describing the preferred embodiments, an explanation will be given of a conventional signal processing circuit of a bar code reader. FIG. 1 is a circuit diagram of a conventional signal processing circuit of a bar code reader. In FIG. 1, reference number 30 denotes a signal input unit, 31 an amplifier, 32 a differential circuit, 33 a low-pass filter, 34 an amplifier, 35 an integration circuit, 36 a comparator, 37 a resistor, 38 an amplifier, 39 a peak hold circuit, 40 a DC level circuit, 41 a discharge circuit, 42 a voltage division circuit, 43 an inversion amplifier, 44 and 45 comparators, 46 and 47 delay circuits, 48 and 49 AND gates, 50 an inverter, and 51 a flip-flop circuit.

Further, 60 denotes a comparison unit, 61 a slice level generation unit, 62 a gate signal output unit, and 63 a signal output unit.

As shown in the drawing, the comparison unit 60 is formed by the integration circuit 35, the comparator 36, and the resistor 37. The slice level generation unit 61 is formed by the peak hold circuit 39, the DC level circuit 40, the discharge circuit 41, the voltage division circuit 42, and the inversion amplifier 43. The gate signal output unit 62 is formed by the comparators 44 and 45, and the delay circuits 46 and 47. The signal output unit 63 is formed by the AND gates 48 and 49.

Next, the operation of the conventional circuit is explained in detail with reference to FIGS. 1 and 2.

A bar code signal optically detected by the signal input unit 30 is converted to an electrical signal and amplified by the amplifier 31. The signal 1 in FIG. 2 denotes the signal amplified by the amplifier 31. The signal 1 is differentiated by the differential circuit 32 and the differentiated signal is input to the low-pass filter 33 to eliminate high frequency noise contained in the signal. The signal 2 in FIG. 2 denotes the signal filtered by the low-pass filter 33.

The signal 2 is divided into two routes. In one route, the signal 2 is input to the comparator 60 through the amplifier 34. In the other route, the signal 2 is input to the slice level generation unit 61 and the gate signal output unit 62 through the amplifier 38.

In the slice level generation unit 61, the amplified signal 2 is input to the peak hold circuit 39 and the DC level circuit 40. The output waveform of the peak hold circuit 39 is shown by PHS in FIG. 2. The output of the DC level circuit 40 is shown by DCL in FIG. 2. Both outputs of the peak hold circuit 39 and DC level circuit 40 are input to the discharge circuit 41. The output of the discharge circuit 41 is input to the voltage division circuit 42. The output of the voltage division circuit 42 is used as the negative slice voltage (level) $-SL$ in the gate signal output unit 62. The output of the voltage division circuit 42 is also input to the inversion circuit 43. The output of the inversion circuit 43 is used as the positive slice voltage (level) $+SL$ in the gate signal output unit 62.

In the gate signal output unit 62, the comparator 44 receives the amplified signal 2 at the (+)input terminal, and receives the positive slice level $+SL$ at the (−)input terminal. The comparator 45 also receives the amplified signal 2 at the (+)input terminal, and receives the negative slice level $-SL$ at the (−)input terminal. The output of the comparator 44 is input to the signal output unit 63 after being delayed by the delay circuit 46. Similarly, the output of the comparator 45 is input to the signal output unit 63 after being delayed by the delay circuit 47.

In the comparison unit 60, the signal 2 amplified by the amplifier 34 is input to the integration circuit 35 and the comparator 36. The output of the integration circuit 35 is shown by the signal 3 in FIG. 2. The comparator 36 receives the signal 2 at the (−)input terminal, receives the signal 3 at the (+)input terminal, and outputs the signal 4 to the signal output unit 63 after comparison.

In the signal output circuit 63, the signal 4 is input to the AND gate 48, and the signal 4 through the inverter 50 is input to the AND gate 49. Further, the AND gate 48 receives the delay signal from the delay circuit 46, and the AND gate 49 receives the delay signal from the delay circuit 47. The outputs of the AND gates 48 and 49 become an edge signal indicating the start and end of the black bar. The outputs of the AND gates 48 and 49 are input to the flip-flop circuit 51 and the bar code is binary-coded by the flip-flop circuit 51. The width and number of the black/white bars are detected in the flip-flop circuit 51, and the bar code is decoded as the binary-coded signal 11.

Figure 3A:
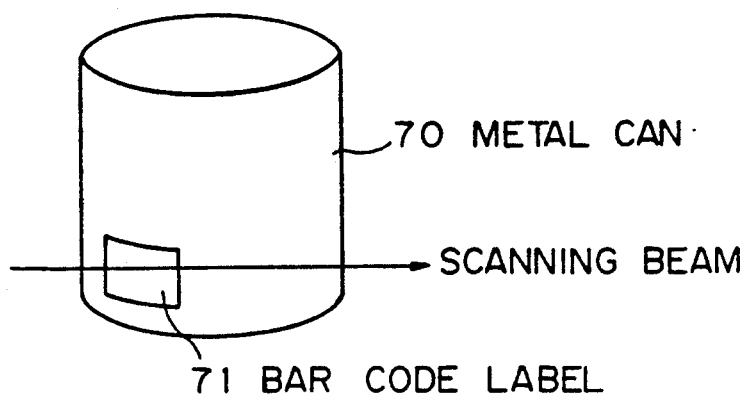
FIGS. 3A to 3C are diagram for explaining problems with a metal can.
Figure 3B:
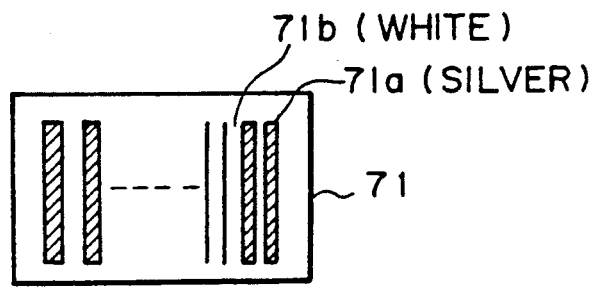
Figure 3C:
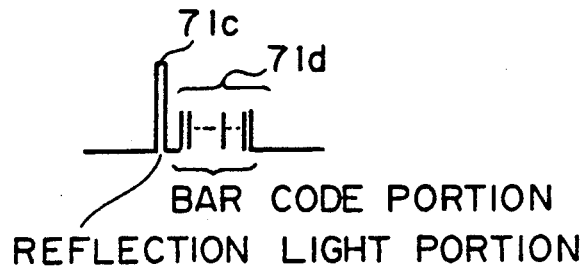

FIGS. 3A to 3C are diagrams for explaining problems with a metal can. In FIG. 3A, 70 denotes a metal (for example, an aluminum) can, such as a juice can. 71 denotes the bar code printed on the surface of the metal can.

In FIG. 3B, the bar code 71 is printed on the surface of the metal can. 71a denotes a black bar, and 71b denotes white bar. In this case, the black bar 71a is constituted by the surface of the metal, i.e., the surface of the aluminum. While, the other portions including the white bar 71b are printed in white. Problems occur in this type of black bar 71a.

In FIG. 3C, 71c denotes a large peak as a noise portion, and 71d denotes the bar code portion as the data. The beam, for example, a laser beam, scans the bar code in the direction of the arrow in FIG. 3A. When beam scans the bar code, the large peak 71c is detected by the signal input unit 30. This peak corresponds to the peak shown in FIG. 2. The large peak 71c occurs when the scanning beam is fully reflected from the metal surface in the edge of the bar code. This peak 71c is very large compared with the bar code portion 71d as shown in FIGS. 2 and 3c.

Figure 2:
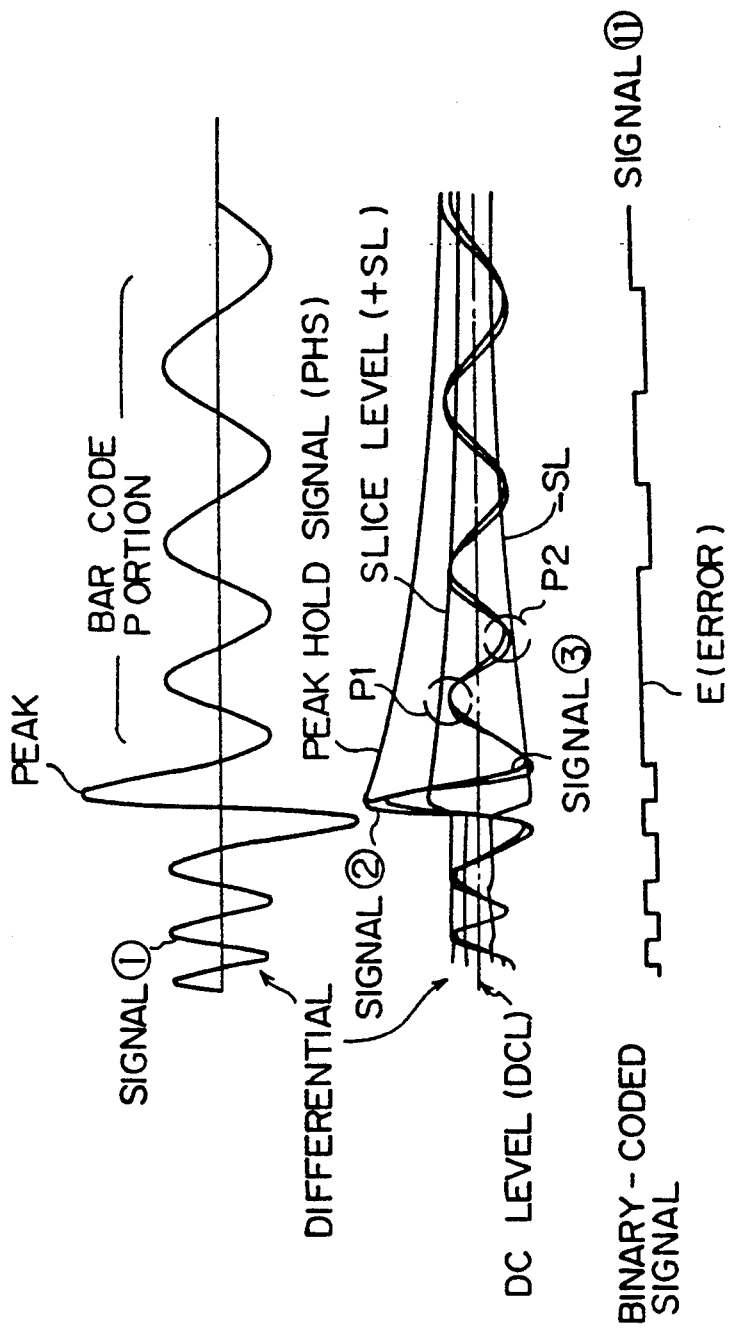
FIG. 2 is a waveform diagram of waveforms at various points of signal processing circuit shown in FIG. 1.

As explained in FIG. 1, the peak hold circuit 39 and the discharge circuit 41 generate the peak hold signal PHS as shown in FIG. 2. Further, the slice level SL is generated from the voltage division circuit 42. In this case, the slice level SL is determined to be, for example, half of the level of the peak hold signal PHS. Accordingly, when the peak level is very high, the peak hold signal PHS thereof also becomes very high.

As a result, as shown by circles P1 and P2 in FIG. 2, when a large peak is detected in the start of the read of the bar code by means of the beam, the slice level SL also becomes high level so that the signals 2 and 3 at the bar code portion cannot exceed the slice levels $+SL$ and $-SL$.

Accordingly, a precise binary-coded signal 11 cannot be obtained in these portions P1 and P2 so that an error signal E is output from the flip-flop circuit 51. As shown in FIG. 2, the binary-coded error signal E becomes a very large signal corresponding to the non-detected portions P1 and P2.

FIG. 4 is a basic block circuit diagram of a signal processing circuit of a bar code reader according to the present invention, and FIG. 5 is a waveform diagram of waveforms at various points of the signal processing circuit shown in FIG. 4.

In FIG. 4, each unit corresponds to those in FIG. 1 as follows.

The differential unit D corresponds to the amplifier 31, the differential circuit 32, and the low-pass filter 33, the comparison unit C corresponds to the comparison unit 60, the slice level generation unit S corresponds to the slice level generation unit 61 except that an upper limitation circuit 6 is added, the gate signal generation circuit G corresponds to the gate signal generation circuit 62, and the signal output unit OUT corresponds to the signal output unit 60.

As shown in the drawing, the upper limitation circuit 6 is added to the output of the peak hold circuit 5. As previously explained in FIG. 1, the bar code is optically detected and electrically converted by the signal input unit 30, and the detection signal is amplified by the amplifier 31 so that the signal 1 is obtained. The signal 1 is differentiated by the differentiation circuit 32 and filtered by the low-pass filter 33 so that the signal 2 is obtained.

In FIG. 4, the signal 2 is input to the peak hold circuit 5. The upper limitation circuit 6 suppresses the peak voltage of the peak hold signal PHS to a predetermined limitation voltage when the peak hold signal PHS exceeds the predetermined limitation voltage.

The signal 2' generated by the discharge circuit 7 denotes a new peak hold signal suppressed by the upper limitation circuit 6. Accordingly, the slice voltage (slice level) SL generated by the voltage division circuit 8 can be set to a level lower than the conventional level because the slice level SL is determined as half of the new peak hold signal.

As shown by circles P1 and P2 in FIG. 5, the differential and integrated waveforms can exceed the slice levels +SL and −SL so that it is possible to precisely detect the binary-coded signal 11.

As previously explained, the slice levels +SL and −SL are input to the gate signal generation unit G. Further, the amplified signal 2 is also input to the gate signal generation unit G. While, the signal 4, i.e., the output of the comparison unit C is input to the signal output unit OUT. Further, the output of the gate signal generation unit G is also input to the signal output unit OUT. As a result, the binary-coded signal 11 is output from the flip-flop circuit FF.

According to the present invention, even if the peak level caused by the noise is very large in the peak hold circuit 5, it is possible to obtain a suitable slice level SL by suppressing the peak hold signal in the upper limitation circuit 6. Accordingly, it is possible to precisely detect the binary-coded signal from the flip-flop circuit.

Figure 6:
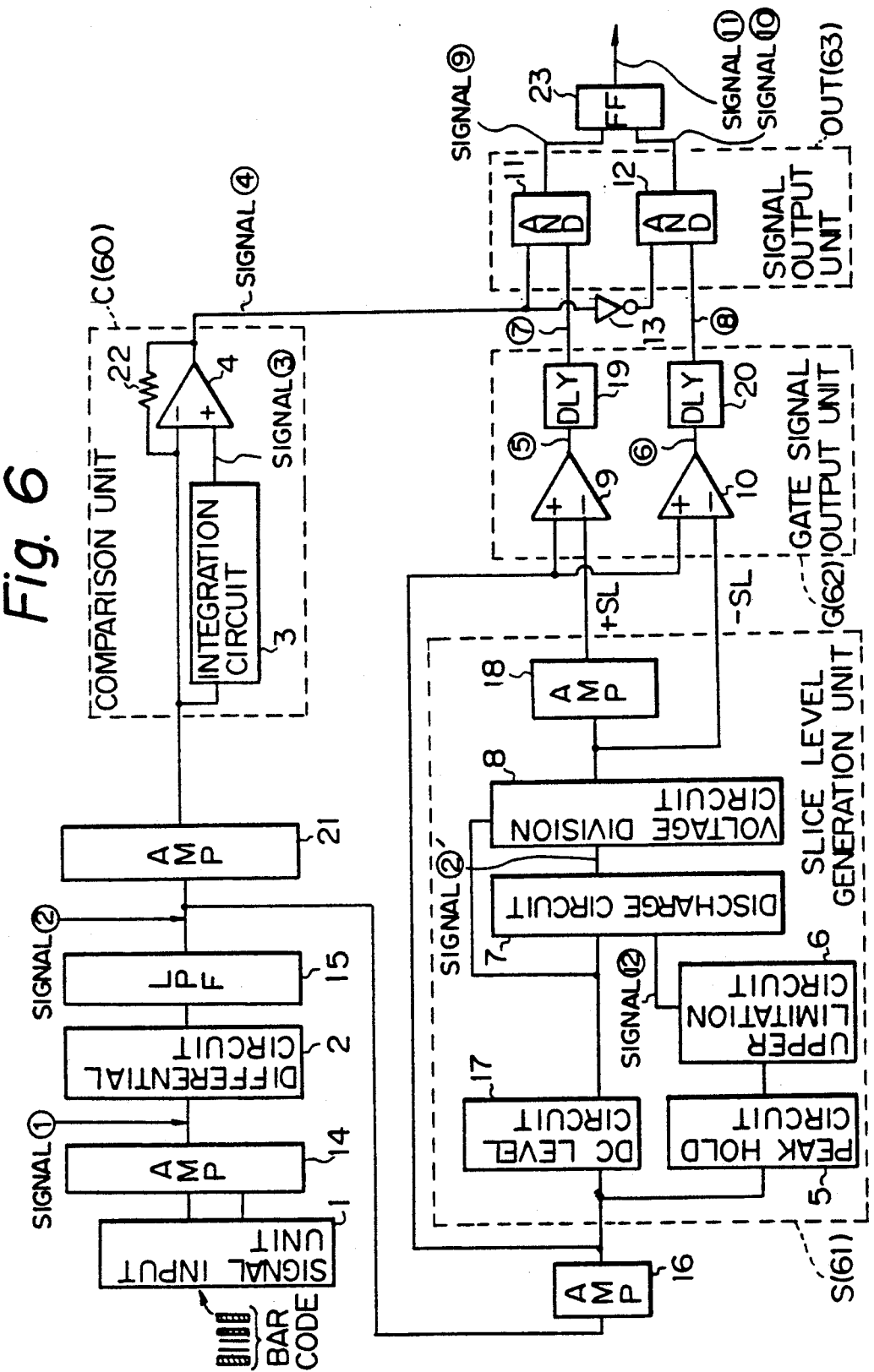
FIG. 6 is a block diagram of a signal processing circuit of a bar code reader according to an embodiment of the present invention.
Figure 7:
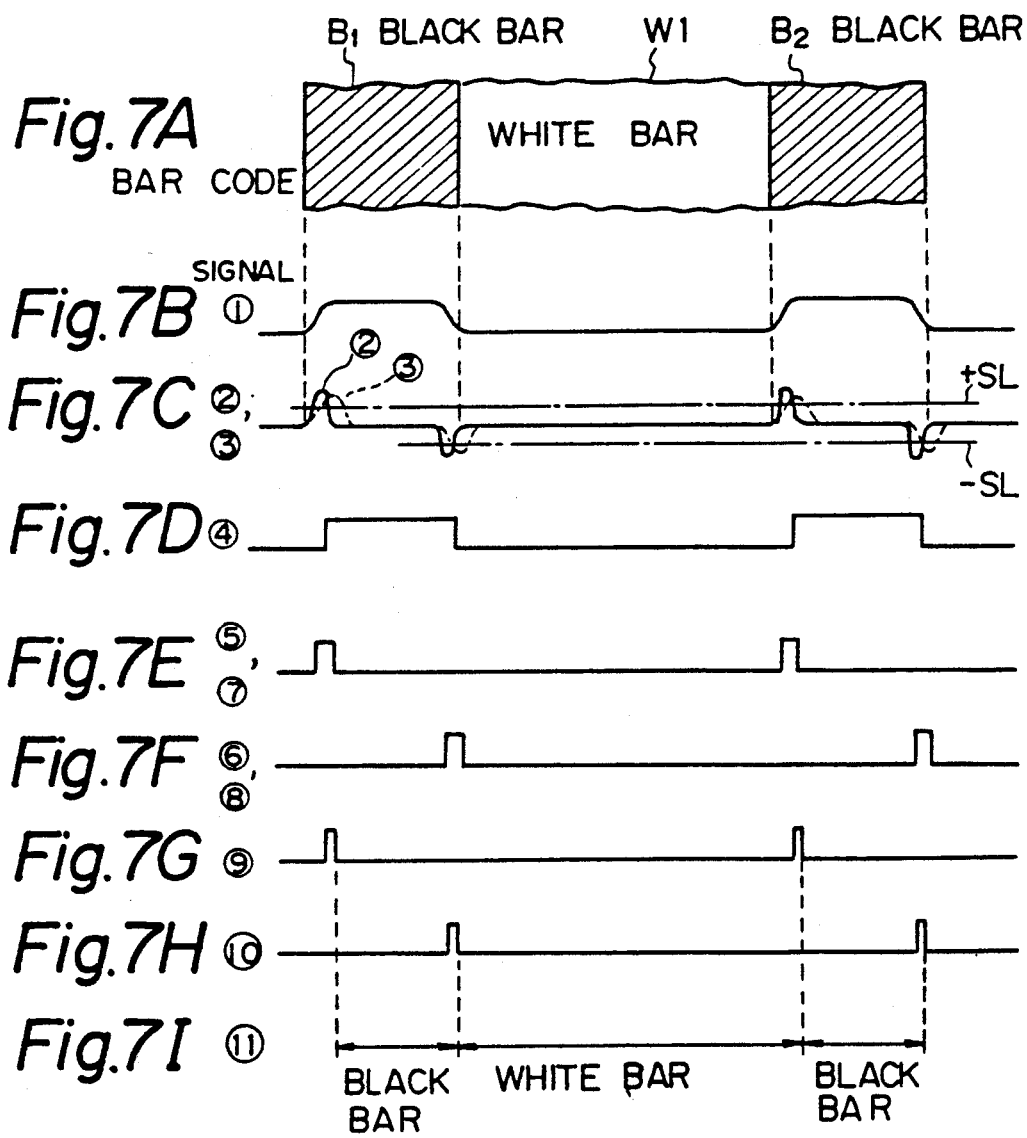
FIGS. 7A, to 7I are timing diagrams for explaining waveforms detected from the bar code.

FIG. 6 is a circuit diagram of a signal processing circuit of a bar code reader according to an embodiment of the present invention. As shown in FIG. 6, in the present invention, the upper limitation circuit 6 is added between the peak hold circuit 5 and the discharge circuit 7 in the slice level generation unit S. The other components are the same as shown in FIG. 1.

The output signal 12 of the upper limitation circuit 6 is input to the discharge circuit 7 so that the suppressed peak hold signal 2' can be obtained from the discharge circuit 7. As a result, it is possible to obtain a suitable slice level ±SL from the voltage division circuit and the inversion amplifier.

FIGS. 7A to 7I are waveform diagrams for explaining waveforms detected from the bar code.

In FIGS. 7A and 7B, the black bars B1, B2 and the white bar W1 are detected by the signal input unit 1 so that the signal 1 is obtained after amplification by the amplifier 14.

In FIG. 7C, the signal 1 is differentiated by the differentiation circuit 2 so that the signal 2 is obtained after filtering by the low-pass filter 15 (solid line). Further, the signal 2 is integrated by the integration circuit 3 so that the signal 3 is obtained (dotted line). In FIG. 7C, SL denotes the positive and negative slice levels.

In FIG. 7D, the comparator 4 of the comparison unit C compares the signal 2 with the signal 3. When the signal 3 is larger than the signal 2, the high level signal 4 is output from the comparator 4.

In FIGS. 7E and 7F, these gate signals are obtained from the comparators 9 and 10. That is, when one differential signal 2 (positive side) shown in FIG. 7C is sliced by the slice level +SL, the signal 5 is obtained from the comparator 9. When the other differential signal (negative side) shown in FIG. 7C is sliced by the slice level −SL, the signal 6 is obtained from the comparator 10. These signals are delayed by the delay circuits 19 and 20 so that the signals 7 and 8 are obtained, respectively.

In FIGS. 7G and 7H, the signal 4 and the signal 7 are input to the AND gate 11 so that the signal 9 is obtained when both signals are high. Further, the inverted signal 4 and signal 8 are input to the AND gate 12 so that the signal 10 is obtained when both signals are high.

In FIG. 7I, the signals 9 and 10 are input to the flip-flop circuit 23 so that the binary-coded signals 11 indicating the black bars and the white bar are output from the flip-flop circuit 23.

Figure 8:
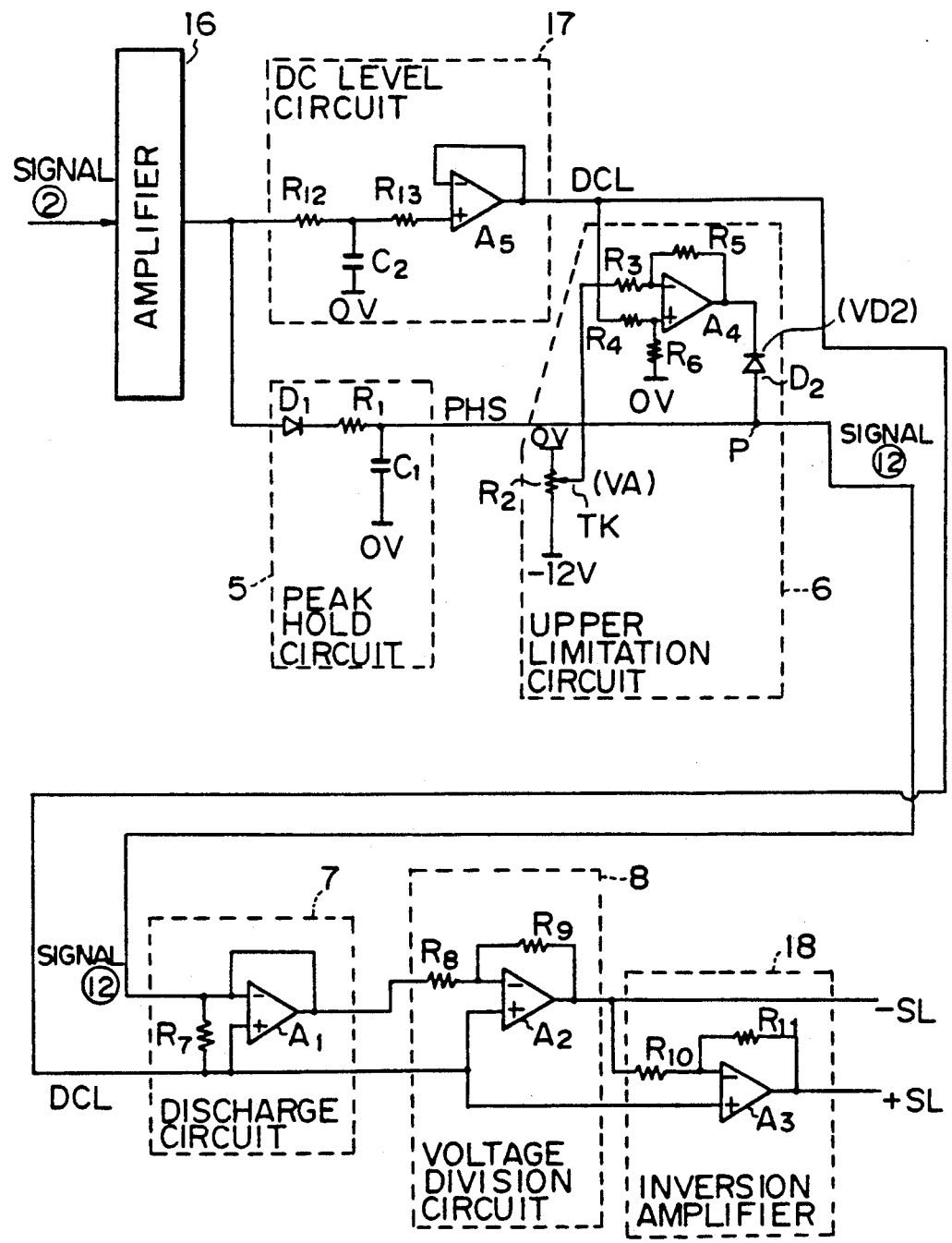
FIG. 8 is a detailed circuit diagram of the slice level generation unit shown in FIG. 6.

FIG. 8 is a detailed circuit of the slice level generation unit shown in FIG. 6. In FIG. 8, the same reference numbers as shown in FIG. 6 denote the same components as that of FIG. 6. Further, R1 to R13 denote resistors, C1 and C2 capacitors, D1 and D2 diodes, and A1 to A5 operational amplifiers.

In the discharge circuit 7, the amplifier A1 is used as a voltage follower circuit. In the voltage division circuit 8, the amplifier A2 is used for obtaining half of the output voltage of the amplifier A1. In the inversion circuit 18, the amplifier A3 is used for obtaining the inverted slice level (i.e., positive slice level). In the upper limitation circuit 6, the amplifier A4 is used for outputting a new peak hold signal as explained in detail hereinafter.

In the upper limitation circuit 6, VA denotes the voltage at the point TK of the variable resistor R2 which is used for obtaining the upper limitation voltage. VD2 denotes the voltage across the clamp diode D2. The upper limitation circuit 6 suppresses the voltage of the signal 12 so as not to exceed the sum of the output voltage of the DC level, the voltage VA and the voltage VD2.

The operation of the circuit shown in FIG. 8 is explained below. The peak hold circuit 5 outputs the peak hold signal PHS. In this case, the discharge operation is performed in accordance with the time constant defined by the capacitor C1 of the peak hold circuit 5 and the resistor R7 of the discharge circuit 7. In the upper limitation circuit 6, when the voltage at the point P (i.e., the voltage of signal 12) exceeds the predetermined upper voltage defined by the variable resistor R2, current flows from the point P to the operational amplifier A4 through the diode D2. Accordingly, the operational amplifier A4 functions to reduce the peak voltage to the predetermined limitation level when the peak voltage exceeds the upper limitation voltage. Accordingly, it is possible to always limit the voltage of the point P so as not to exceed the predetermined upper limitation voltage.

The operation of the present invention is explained in detail below with reference to FIGS. 6 to 10.

Figure 9:
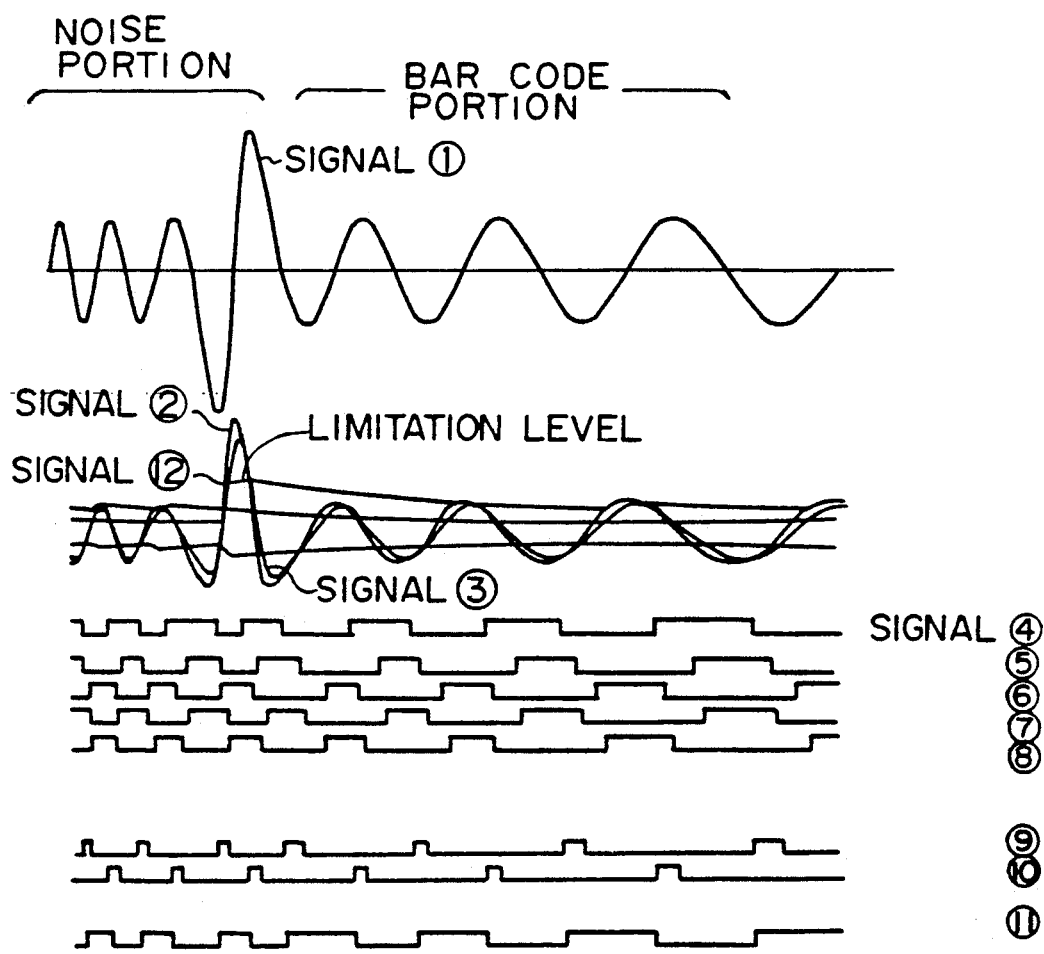
FIG. 9 is a waveform diagram of waveforms at various points of a signal processing circuit shown in FIG. 6.

The bar code detected by the signal input unit 1 is amplified by the amplifier 14 so that the signal 1 is obtained. The signal 1 includes the large peak as shown in FIG. 9. The signal 1 is differentiated by the differentiation circuit 2 and is filtered by the low-pass filter 15 so that the signal 2 is obtained. Since the low-pass filter 15 is used for eliminating the high frequency noise, the large peak remains in the signal 12.

The signal 2 is amplified by the amplifier 21 and integrated by the integration circuit 3 in the comparison unit C so that the signal 3 is obtained. The comparator 4 compares the signal 3 with the amplified signal 2 and outputs the signal 4 when the signal 3 is larger than the amplified signal 2.

Further, the signal 2 is amplified by the amplifier 16, and input to the peak hold circuit 5 and the DC level circuit 17.

The output of the peak hold circuit 5 (peak hold signal) is input to the upper limitation circuit 6. In the upper limitation circuit 6, the voltage level of the peak hold signal is suppressed to the predetermined limitation level when the voltage level thereof exceeds the predetermined limitation level as shown by the signal 12 in FIG. 9.

The voltage of the signal 12 is gradually discharged by the discharge circuit 7 and divided by half of the discharge voltage by the voltage division circuit 8 to obtain the negative slice level −SL. The inversion circuit 18 is provided for obtaining the positive slice level +SL.

The positive and negative slice levels ±SL are input to the comparators 9 and 10. In the comparators 9 and 10, the amplified signal 2 is compared with the positive slice level +SL and the negative slice level −SL so that the signals 5 and 6 are obtained from the comparators 9 and 10, respectively.

The delay circuits 19 and 20 are provided for compensating the delay time in the integration circuit 3. The delayed signals 7 and 8 are input to the AND gates 11 and 12. When the signal 4 and the signal 7 are high, the AND gate 11 outputs the high level signal. Further, when the inverted signal 4 and the signal 8 are high, the AND gate 12 outputs the high level signal. These high level signals 9 and 10 are input to the flip-flop circuit 23 so that the binary-coded signal 11 is output therefrom.

FIG. 10 is a partially enlarged view of the waveform shown in FIG. 9. This drawing is provided to clarify the timing of each of the signals 4, 5, 7, and 9. Since this was already explained, the explanation thereof is omitted at this point.

I claim:

1. A signal processing circuit of a bar code reader, comprising:

signal input means for optically detecting a bar code provided on a surface of goods and outputting a first signal after optical-to-electrical conversion;

differential means, connected to said signal input means, for amplifying the first signal, differentiating the first signal, filtering the first signal after differentiation to eliminate a high frequency noise, and outputting a second signal after filtering;

comparison means, connected to said differential means, for integrating the second signal and outputting a third signal after integration, and comparing the second signal with the third signal and outputting a fourth signal when the third signal is larger than the second signal;

slice level generation means, connected to said differential means, for holding a peak voltage of the second signal, suppressing the peak voltage to a predetermined upper limitation voltage, discharging the suppressed peak voltage in accordance with a predetermined time constant, and dividing the suppressed peak voltage into a predetermined voltage rate to obtain a positive slice voltage and a negative slice voltage;

gate signal output means, connected to said differential means and said slice level generation means, for comparing the second signal with the positive slice voltage and the negative slice voltage; and signal output means, connected to said comparison means and said gate signal output means, for inputting the fourth signal and the positive slice voltage, inputting the inverted fourth signal and the negative slice voltage, and outputting a gate signal to obtain a binary-coded signal.

2. A signal processing circuit as claimed in claim 1, wherein said slice level generation means comprises:

a peak hold circuit for receiving the second signal and holding the peak voltage of the second signal;

an upper limitation circuit connected to said peak hold circuit for receiving an output of said peak hold circuit and suppressing the peak voltage to the predetermined upper limitation voltage; and a discharge circuit connected to said upper limitation circuit for discharging the peak voltage suppressed by said upper limitation circuit in accordance with the predetermined time constant.

3. A signal processing circuit as claimed in claim 1, wherein the predetermined voltage rate is determined to be half of the upper limitation voltage.

4. A signal processing circuit as claimed in claim 2, wherein said upper limitation circuit comprises:

an operational amplifier to reduce the peak voltage when the peak voltage exceeds the predetermined upper limitation voltage; and a variable resistor to determine the upper limitation voltage.

5. A signal processing circuit according to claim 1, wherein said slice level generation means comprises:

a peak hold circuit;

an upper limitation circuit connected to said peak hold circuit;

a discharge circuit connected to said upper limitation circuit; and a voltage division circuit connected between said discharge circuit and said gate signal output means.

* * * * *